W. D. GOFF.
ANIMAL POKE AND WEANER.
APPLICATION FILED MAY 13, 1913.
1,105,767.
Patented Aug. 4, 1914.
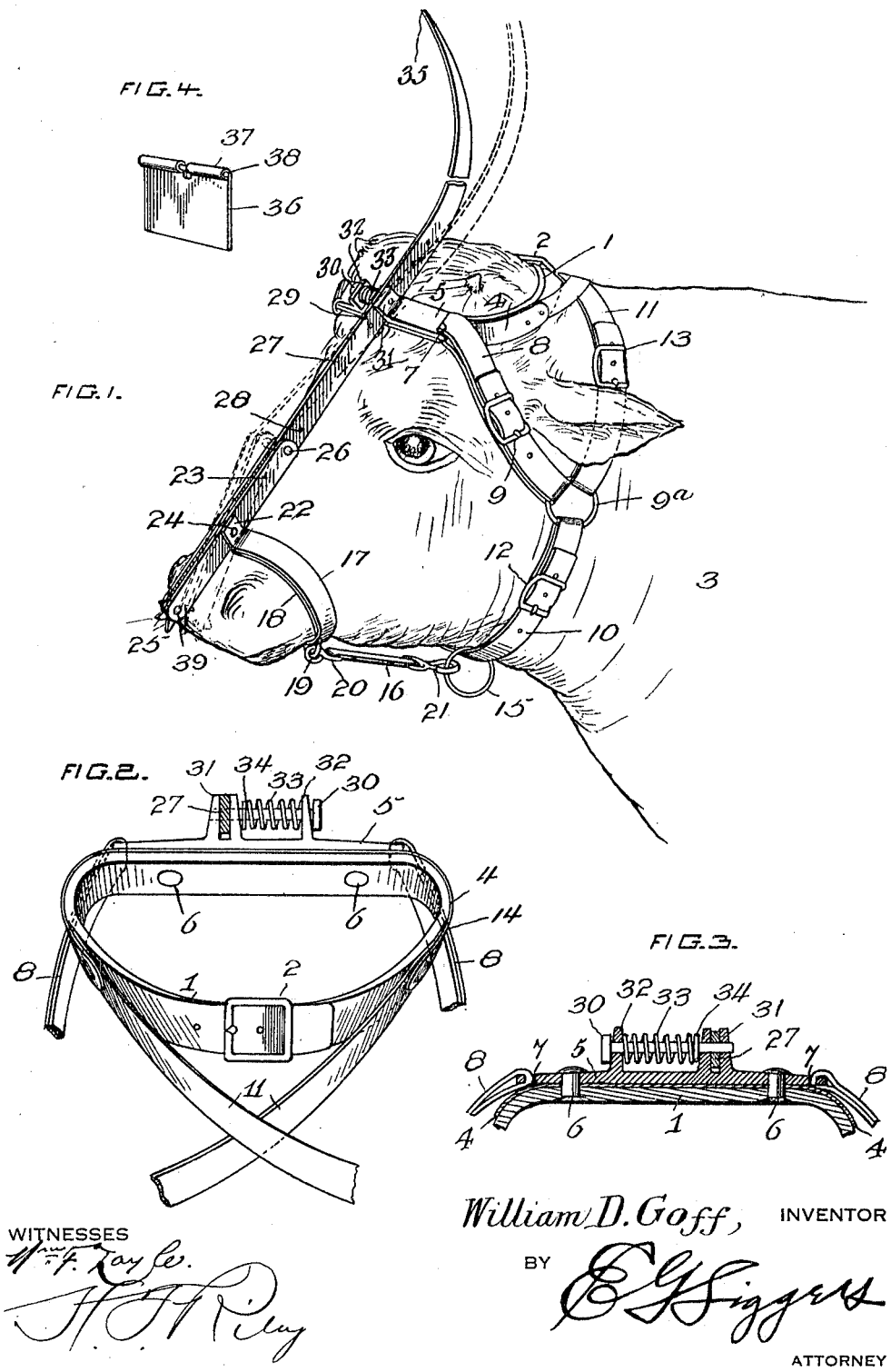
William D. Goff, INVENTOR

UNITED STATES PATENT OFFICE.

WILLIAM D. GOFF, OF JOPLIN, MISSOURI.

ANIMAL POKE AND WEANER.

1,105,767.   Specification of Letters Patent.   Patented Aug. 4, 1914.

Application filed May 13, 1913. Serial No. 767,336.

*To all whom it may concern:*

Be it known that I, WILLIAM D. GOFF, a citizen of the United States, residing at Joplin, in the county of Jasper and State of Missouri, have invented a new and useful Animal Poke and Weaner, of which the following is a specification.

The invention relates to improvements in animal pokes and weaners.

The object of the present invention is to improve the construction of animal pokes, and to provide a simple, inexpensive and efficient device adapted to be readily applied to the head of a calf, and capable of adjustment to suit the size of the same, and equipped with a rowel and operating means adapted to throw the dowel into the nose of an animal should the same push against a wire or other fence, and also adapted to cause the rowel to engage the nose of the animal should it throw its head back for jumping.

Another object of the invention is to provide a device of this character adapted to support a weaner flap clear of the mouth of an animal while the same is feeding at the ground, and capable when the animal throws its head upward for sucking to drop the flap over the mouth and at the same time cause the animal to prod both itself and the cow.

A further object of the invention is to provide an animal poke and weaner of this character in which the rowel and operating means may be readily removed and the rest of the device used as a halter, when it is desired to tie an animal in a barn.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of an animal poke and weaner, constructed in accordance with this invention and shown applied to the head of a calf. Fig. 2 is a detail perspective view of a portion of the device, illustrating the construction of the brow band and the bracket for supporting the rear lever, the latter being in section. Fig. 3 is a transverse sectional view through the bracket, illustrating the construction for detachably pivoting the rear lever in the bracket. Fig. 4 is a detail view of the weaner flap.

Like numerals of reference designate corresponding parts in all the figures of the drawing.

In the accompanying drawing in which is illustrated the preferred embodiment of the invention, the animal poke comprises in its construction a brow band 1 having a buckle 2 and adapted to be secured around the top of the head of a calf 3, as clearly illustrated in Fig. 1 of the drawing. The buckle is preferably arranged at the back of the brow band, which is reinforced at the exterior by a pliable metallic strip 4, extending across the front of the brow band and partially around the sides and adapted to be shaped by bending to fit the head of the animal, and capable of stiffening the brow band and preventing the same from twisting. The front of the brow band also has mounted on it a bracket 5, preferably consisting of a malleable casting and secured to the brow band by rivets 6, or other suitable fastening devices, which pierce the end portions of the bracket, the metallic strip 4 and the front portion of the brow band. While the bracket preferably consists of a malleable casting, it may be constructed in any other suitable manner, and is provided at its terminals with slots or openings 7 for the reception of the front side or check straps 8, which extend downwardly and rearwardly from the opposite sides of the front portion of the brow band.

The front side straps 8 are preferably provided with buckles 9 and form upper and lower end loops, the upper loop being connected to the bracket by means of the said slots or openings 7, and the lower loops being linked into rings $9^a$, which connect a throat latch 10 with the front side straps and with rear top straps 11. The throat latch 10, which passes under the neck of the animal, has a suitable buckle 12, and the rear top straps, which are provided with buckles 13, are secured at their upper ends 14 to the brow band at opposite sides thereof, preferably at the terminals of the metallic strip 4 between the same and the brow band, as clearly illustrated in Fig. 2 of the drawing. The rear top straps are crossed in rear of the brow band, and each extends across the back of the neck of the animal to the other side of the head of the same. The front side straps and the rear top straps diverge downwardly and provide an open space between them at each side of the device for the ears of the animal.

The throat latch is provided with a ring 15 and is connected by a short strap 16 with a metallic nose band 17, provided with a leather lining 18 and having an eye or loop 19 at the bottom to receive a front loop or hook 20 of the strap 16. The strap 16 is preferably provided at its rear end with a snap hook 21 for detachably engaging the ring 15. The nose band is preferably constructed of a single strip of metal, and the terminals thereof are extended and spaced apart at the top of the nose band to provide projecting ears 22 between which is fulcrumed a front lever 23. The lever 23, which is preferably composed of two sides or pieces, is pivoted to the nose band by a rivet 24, or other suitable fastening device, and it carries at its front end a rowel 25. The rear end of the front lever is pivoted by a rivet or pin 26, or other suitable fastening device, to the lower or front end of a rear lever 27, which extends between the sides of the front lever. The rear lever is provided at its front portion with a plurality of perforations 28 to receive the pivot 26 for adjustably connecting the adjacent ends of the levers, and the said rear lever is also provided at an intermediate point with a plurality of perforations 29 adapted to receive a spring actuated bolt or pin 30, which constitutes the pivot or fulcrum for the rear lever. The rear lever is fulcrumed between a pair of projecting ears or lugs 31 of the bracket, which is also provided with an alined guide 32 spaced from the said ears. The pin or bolt, which extends through perforations of the lugs or ears 31 and the guide lug 32, has a coiled spring 33 disposed on it and interposed between the guide lug 32 and a pin 34, but any other suitable stop or abutment may be provided for the inner end of the coiled spring. The coiled spring urges the pivoted bolt inwardly and maintains the same in its operative position, and it permits the bolt to be retracted when it is desired to remove or adjust the rear lever 27. By detaching the rear lever from the bracket and the strap 16 from the ring 15, the rowel and the operating means may be removed and the rest of the device may be used as a halter.

The upper or rear arm of the lever 27 is preferably provided with a pointed terminal 35, and it is curved upwardly and forwardly and is adapted to engage a fence wire, or other object should the animal push against the same. The calf in pushing against the wire throws the rowel down on its nose, or if it should throw its head up to jump, the rear arm of the lever 27 will overbalance the front arm and will swing rearwardly. This will cause the front arm of the lever 27 to swing outwardly and carry with it the rear arm of the front lever and thereby carry the rowel inwardly and prick the nose of the animal.

When it is desired to use the device for weaning a calf, it is equipped with a flap 36 constructed of sheet metal or other suitable material having its upper edge rolled to form opposite eyes 37 for the reception of a pintle 38, which may be substituted for the pivot 39 of the rowel 25. The flap is supported out of the way of the animal and does not interfere with its feeding from the ground, but should the animal throw its head upwardly in attempting to suck, the flap will close over the mouth and prevent the animal from sucking and the rowel will spur both the calf and the cow.

What is claimed is:—

1. A device of the class described including a brow band arranged to completely encircle the upper portion of the head of an animal, a nose band, straps connecting the brow band and the nose band for retaining the same on an animal, a front lever fulcrumed at an intermediate point on the nose band, and a rear lever pivotally connected at its front end to the front lever and fulcrumed at an intermediate point on the said brow band and having an extended rear arm projecting upwardly and forwardly and adapted when the head of the animal is thrown upwardly to overbalance and swing rearwardly to oscillate the front lever.

2. A device of the class described including a front lever, fulcrumed at an intermediate point and provided with means for engaging the nose of an animal, a rear lever fulcrumed at a point intermediate of its ends and pivotally connected at its front end to the front lever, said rear lever having an extended rear arm curved upwardly and forwardly and terminating in a spur and adapted when the head of the animal is thrown upwardly to overbalance and swing rearwardly to oscillate the front lever and cause the same to engage the nose of the animal, and means for mounting the said lever on the head of an animal.

3. A device of the class described including a brow band adapted to encircle the top portion of the head of an animal, a nose band, front side straps extending downwardly and rearwardly from opposite sides of the brow band, rear top straps connected with the brow band and extending downwardly at the back thereof, a throat latch connected with the said straps, means for connecting the throat latch with the nose band, a front lever fulcrumed on the nose band, and a rear lever pivotally mounted on the brow band and connected with the front lever.

4. A device of the class described including a brow band adapted to encircle the top portion of the head of an animal, rear side straps secured to the brow band at opposite sides thereof and crossed in rear of the brow band, each rear strap extending to the other side of the device, front side straps secured to the brow band and extending downwardly and rearwardly, a throat latch connected with the said straps, a nose band, means for detachably connecting the nose band and the throat latch, a front lever fulcrumed on the nose band, and a rear lever pivotally connected to the front lever and detachably fulcrumed on the nose band, said levers and nose band being adapted to be removed and the remaining portion of the device constituting a halter.

5. A device of the class described including a brow band arranged to completely encircle the top of the head of an animal provided with a pliable metallic reinforcing strip adapted to be shaped by bending to fit the head of an animal, a nose band, means for connecting the nose band and the brow band for retaining the same on the head of an animal, and front and rear levers pivotally connected and fulcrumed on the nose band and the brow band, the front lever being provided with means for engaging the nose of an animal.

6. A device of the class described including a nose band, a bracket arranged above and in spaced relation with the nose band and having projecting ears, means for securing the bracket and the nose band to the head of an animal, a spring actuated pivot carried by the bracket and extending through the ears, a rear lever detachably fulcrumed between the ears by the said pin, and a front lever mounted on the nose band and connected with the rear lever.

7. A device of the class described including a brow band adapted to encircle the top portion of the head of an animal, a bracket secured to and extending across the front of the brow band and provided at its ends with openings, front side straps secured in the openings of the bracket and extending downwardly therefrom, rear straps extending downwardly at the back of the brow band, a throat latch connected with the said straps, a nose band, front and rear levers pivotally connected and fulcrumed on the nose band and the said bracket, and means for connecting the nose band and the throat latch.

In testimony, that I claim the foregoing as my own, I have hereto affixed my signature in the presence of two witnesses.

WILLIAM D. GOFF.

Witnesses:
S. H. EDGE,
JOHN HUNTER.

Copies of this patent may be obtained for five cents each, by addressing the "Commissioner of Patents, Washington, D. C."